(12) United States Patent
Smith

(10) Patent No.: US 7,322,637 B2
(45) Date of Patent: Jan. 29, 2008

(54) VEHICLE CARGO BED TENT CAMPER

(76) Inventor: Edward John Smith, 111 W. Brentridge Dr., Brandon, FL (US) 33511

( * ) Notice: Subject to any disclaimer, the term of this patent is extended or adjusted under 35 U.S.C. 154(b) by 80 days.

(21) Appl. No.: 11/101,322

(22) Filed: Apr. 7, 2005

(65) Prior Publication Data

US 2006/0226677 A1 Oct. 12, 2006

(51) Int. Cl.
*B60R 15/00* (2006.01)

(52) U.S. Cl. .................. 296/173; 296/159; 296/156

(58) Field of Classification Search .................. 296/37, 296/410, 100.03–100.05, 169, 173, 1.1, 156, 296/159, 161, 164, 165, 75, 170, 39.1, 39.2; 135/87, 88.01

See application file for complete search history.

(56) References Cited

U.S. PATENT DOCUMENTS

| 1,564,257 | A | * | 12/1925 | Lippman | 296/169 |
| 2,152,713 | A | * | 4/1939 | Stewart | 296/169 |
| 3,162,477 | A | * | 12/1964 | Jackson, Jr. | 296/169 |
| 3,455,596 | A | * | 7/1969 | Krutzikowsky | 296/156 |
| 3,468,082 | A | * | 9/1969 | Branch | 296/164 |
| 3,737,190 | A | * | 6/1973 | Smith et al. | 296/159 |
| 4,394,100 | A | * | 7/1983 | Sperlich | 410/2 |
| 4,733,898 | A | | 3/1988 | Williams | |
| 4,887,947 | A | * | 12/1989 | Bott | 410/144 |
| 6,217,106 | B1 | * | 4/2001 | Reckner, Jr. | 296/173 |
| 6,505,878 | B1 | * | 1/2003 | Mascolo | 296/100.04 |

* cited by examiner

*Primary Examiner*—Dennis H Pedder
*Assistant Examiner*—Melissa Black

(57) ABSTRACT

A vehicle cargo bed tent camper consisting of split rigid covers that when closed are locked together and have a dual function: secure covers that lock both the entrance and the cargo bed. They also protect the contents in the cargo bed from the weather and theft. Secondly, when the covers unlock they are lifted, sliding and extending over and on the cargo bed sides. Their tops or weathered surface then become mattress supports. The cargo bed covers use the top and sides of the cargo bed as supports and guides in the operation of opening and closing. Rigid main frame tent supports with the tent attached are raised and surround it all.

15 Claims, 8 Drawing Sheets

VEHICLE CARGO BED TENT CAMPER

BACKGROUND OF THE INVENTION

1. Field of Invention

This invention relates to vehicle cargo bed tent campers that use the cargo beds of pickup trucks, open trailers and the like.

2. Description of the Related Art

Outdoor activities such as camping have increased in popularity over the years, along with the popularity of camping in pickup trucks and tent trailers. As these trends indicate, the public wants low cost cargo bed campers giving them shelter, security, storage area and convenience all in many different model campers. One such model is the aluminum or fiberglass toppers used over the cargo beds. Some Patents that are in this category are U.S. Pat. No. 6,394,532, U.S. Pat. No. 6,712,421 and U.S. Pat. No. 5,704,681. All have been adapted for camping, but they have limited space and the occupants have to sleep on an uneven steel floor and they have little to no storage space. They also have poor ventilation.

Camping tent trailers are also popular and come equipped with a one piece hard top covering the vehicles cargo bed. The hard tops are raised up by various mechanical or hydraulic methods. The bed platforms slide out over the front and rear of the trailer using metal guides under the platforms. The tents are attached to the hard top and the sides of the trailer as well as underneath of the bed platforms. Some Patents that are in this category are U.S. Pat. No. 6,217,106 and U.S. Pat. No. 5,505,515. Camping Trailers have a draw back of a higher price due to all the mechanical and hydraulic features as well as the extra weight which means not all the vehicles can tow them and they cost more to tow.

One piece solid tonneau covers with tent attached and hinged to the cargo bed have also been adapted and are popular for pickup trucks. They are low priced, but when you compare them to the other models they are very lacking for space. They have less space then the hard topper, but are the most efficient in aerodynamics and fuel economy on the road. With them you still have to sleep on the steel floor with very little to no storage. They also have poor ventilation. Some patents that are in this category are U.S. Pat. No. 5,057,525 and U.S. Pat. No. 5,024,761.

Next, we have the tent truck campers like U.S. Pat. No. 6,481,784, U.S. Pat. No. 4,652,040 and U.S. Pat. No. 5,954,076. These are campers that have nothing more than an adaptable tent over a truck cargo bed. Some have added floors or platforms above the cargo beds steel floor. With the added floor or not, they still fall into a category of being cramped for space with little or no storage area and not very comfortable. They also don't give protection from the weather or thief when closed and have poor ventilation.

Finally, we have the winged tent campers category for pickups and open trailers. They have hinged bed platforms with tents attached or assembled. An invention in this category for a pickup is U.S. patent application No. 2002/0163221 A1. It has hinged bed platforms or wings that to open rotate up and out over the truck cargo bed sides. The underside or non-weathered surface of the platforms are for sleeping. There are also no ground supports for the platforms and poor ventilation. Another one is U.S. Design Pat. No. Des. 428,595 also with hinged platforms, sleeping on the underside surface and poor ventilation. Camping trailers that are in this category are U.S. Pat. No. 6,102,468 and U.S. Pat. No. 1,241,342. Both of which have hinged platforms with sleeping on the underside of the platforms and poor ventilation.

There is a need for a low cost vehicle cargo bed tent camper that uses the top or weathered surface of the cover for sleeping purposes. A camper that also has more living space and secure storage then what is presently available. It also has to be aerodynamic, low weight, without hinges or metal guides to slide on and good ventilation.

SUMMARY OF THE INVENTION

Although primarily a pickup truck cargo bed tent camper the same moving split bed covers can apply to an open trailer or the like. However, because of the trailer's open cargo bed size and design the opening and closing of the cargo bed covers can be different. It's movement can be either north and/or south longitudinal or either east and/or west widthwise from the mid-point. The camper consists of two rigid locked covers that cover the entire cargo bed protecting the contents in it from the weather and theft. Secondly, when the cargo bed covers unlock each is guided, lifted and extended over and on the cargo bed sides from the mid-point to form the tops of bedding platforms for a mattress or storage. The bedding platforms are supported by the cargo bed sides and the ground support poles. Plural rigid main frame tent supports are then raised with the tent attached and stretched around the perimeter of the camper. Only used in a pickup truck, a one piece three sided molded raised floor with doors or hatches is installed. It uses the second tier manufactured cargo bed horizontal pockets with cross members as floor supports and having sides that raise up and wrap around the top of the cargo bed sides.

BRIEF DESCRIPTION OF DRAWINGS

The advantages of this invention will be apparent upon consideration of the following detailed disclosure of the invention, especially when taken in conjunction with the accompanying drawings wherein.

DETAILED DESCRIPTION

Figure 1:
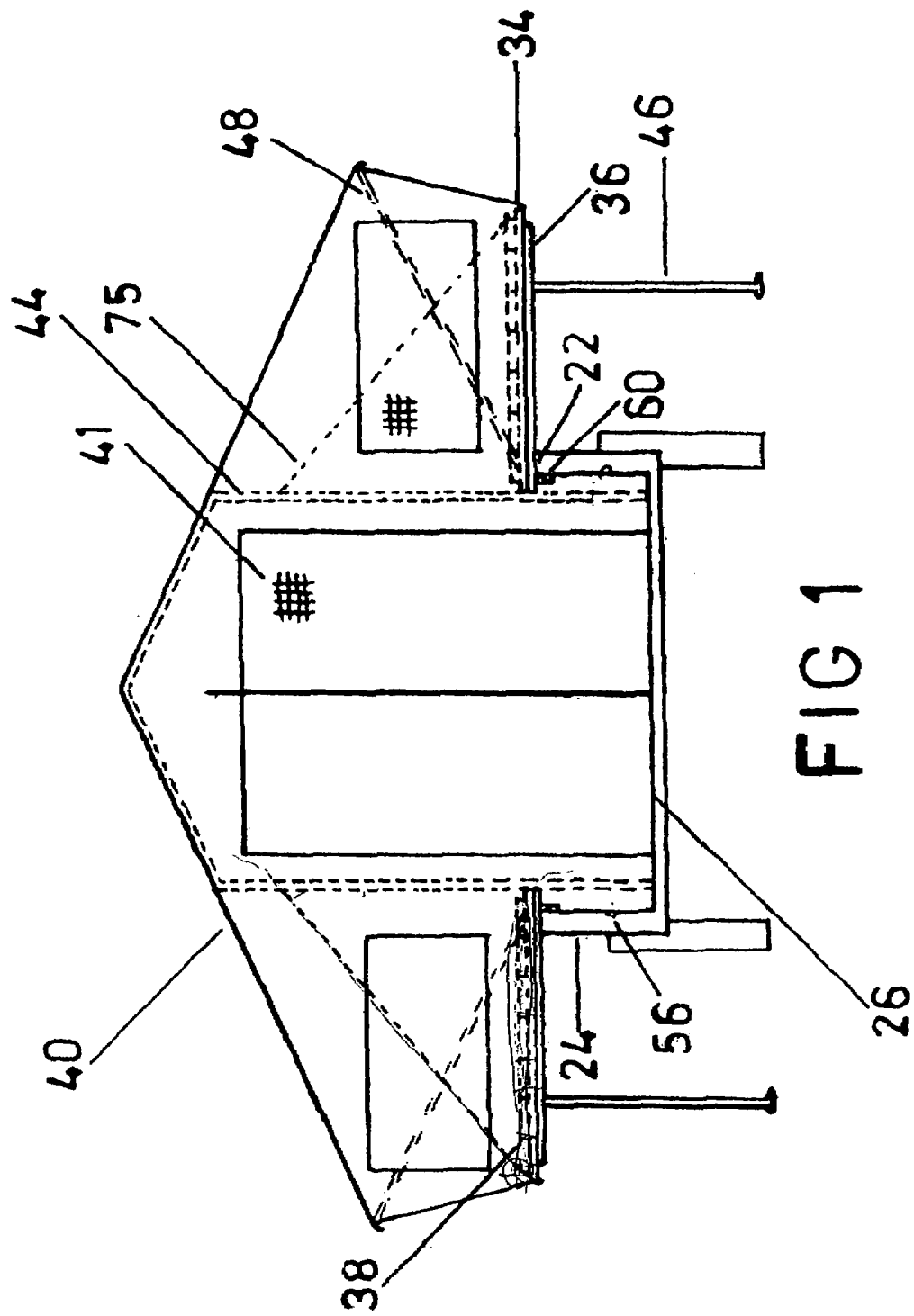
FIG. 1 is a rear view of the open extended camper with the tent raised.
Figure 6:
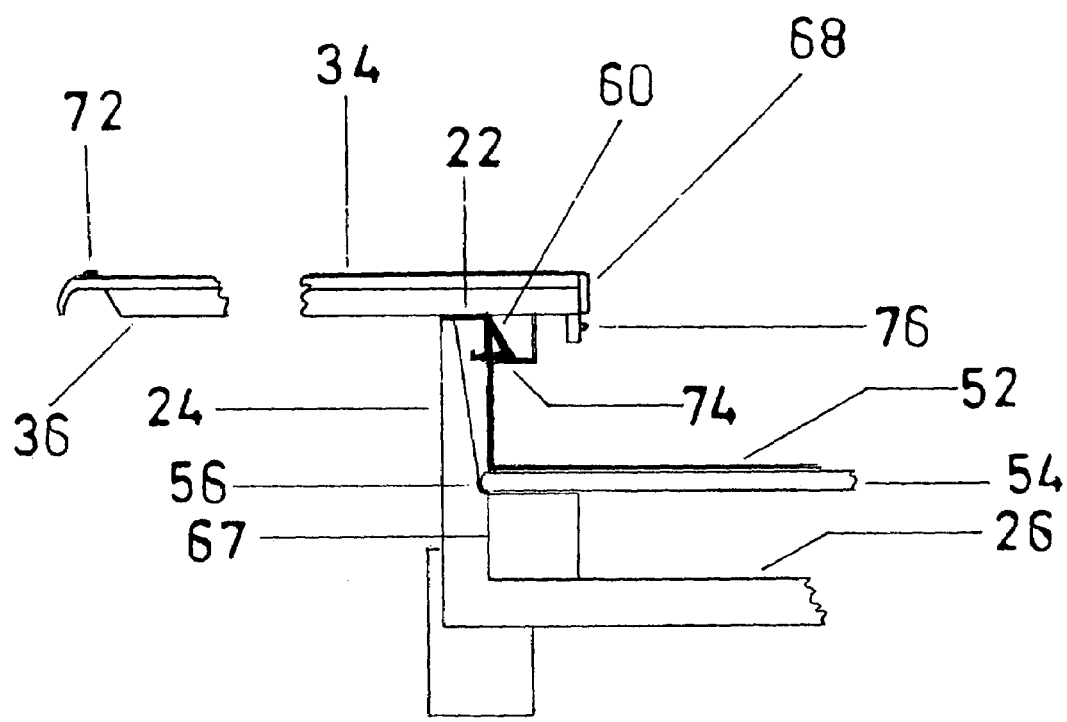
FIG. 6 is a sectional close-up view of the cargo bed cover stabilizer, wedge alignment and pin.

Referring now to the drawings, and particularly FIG. 1, the vehicle cargo bed tent camper shown is on a truck and usually indicated by reference numeral (10). Shown is the open camper with split cargo bed covers (34) extended. Cargo bed covers are supported by the top rim of the cargo bed sides (22) and the ground supporting poles (46). They also have a lower structured frame (36) which supports the cargo bed cover's top or weathered surface (34). The covers, when extended fully, come to a stop when engaging the cargo bed cover's stabilizers (74), shown in FIG. 6. Also, shown in FIG. 6 is the cargo bed cover's pin (76) which locks the covers from moving along with the stabilizers (74). Back in FIG. 1, one views a raised tent (40) with tent screens (41) and flexible windows. The tent is raised by rigid main frame tent supports (44) and extension frame tent supports (48). Shown are second tier manufactured cargo bed horizontal pockets (56). Cargo bed cover rails (38) hold a mattress in place as well as connecting the safety wire (75) to them. Also, attached to the rails are the extension frame tent supports (48). One can also view the cargo bed sides (24), cargo bed floor (26) as well as the wedges or shims (60).

Figure 2:
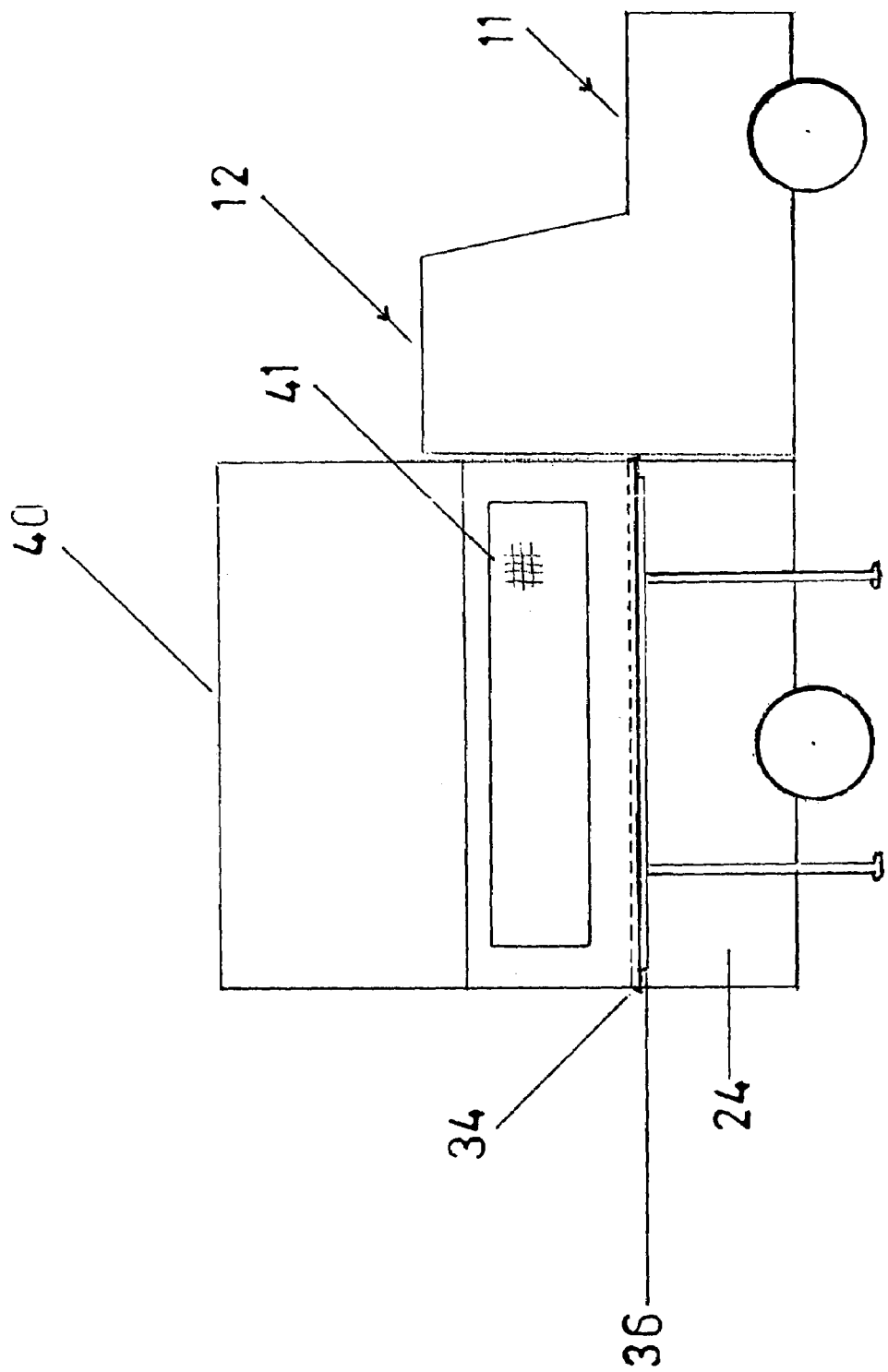
FIG. 2 is a side view of the open truck camper with the tent raised.
Figure 3:
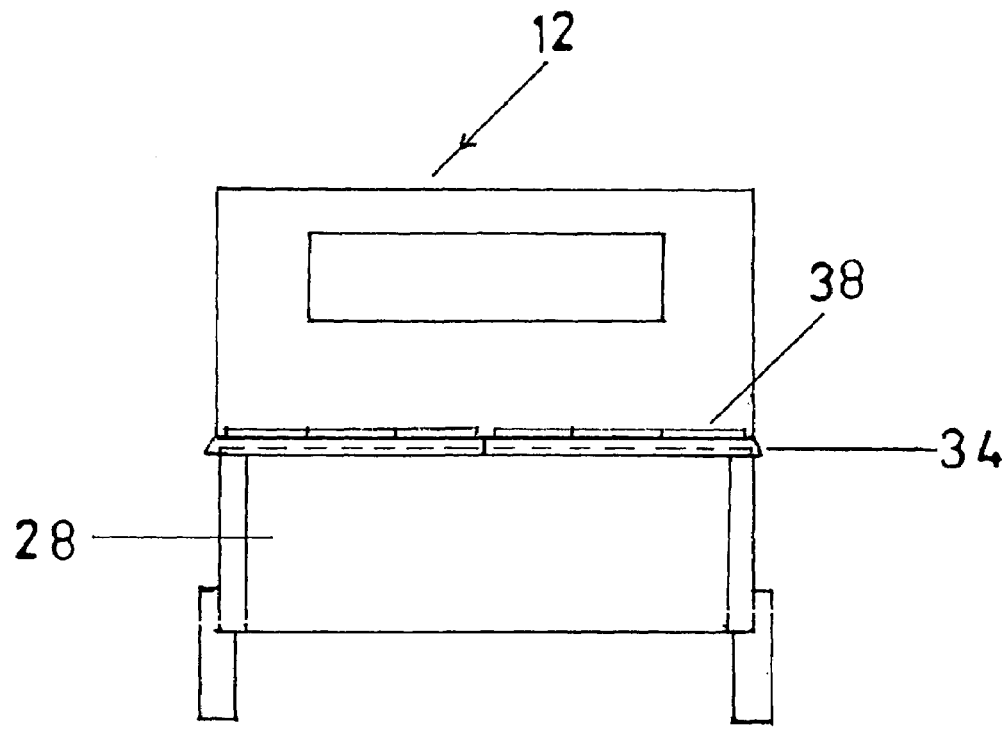
FIG. 3 is a rear view of the closed cargo bed, locked cover and without a luggage cover.
Figure 4:
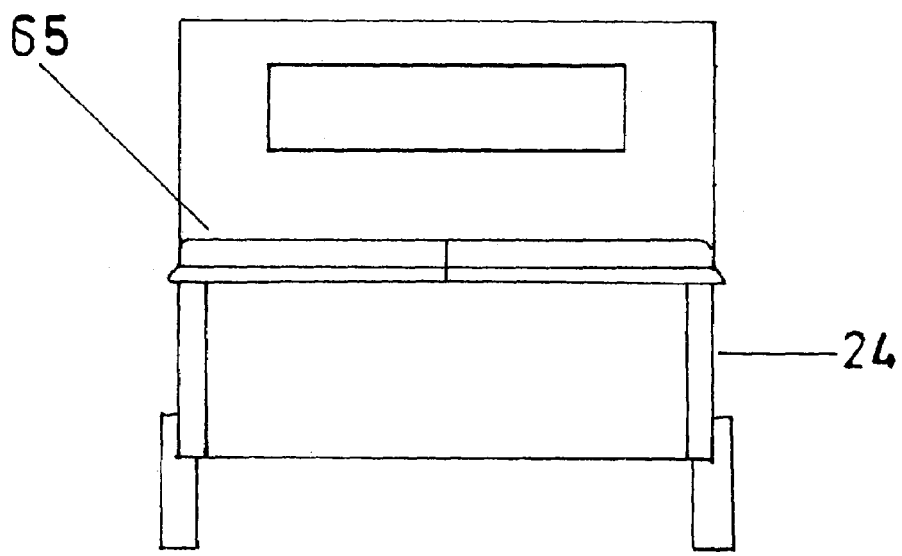
FIG. 4 is a rear view of the closed cargo bed, locked cover and having a luggage cover.
Figure 5:
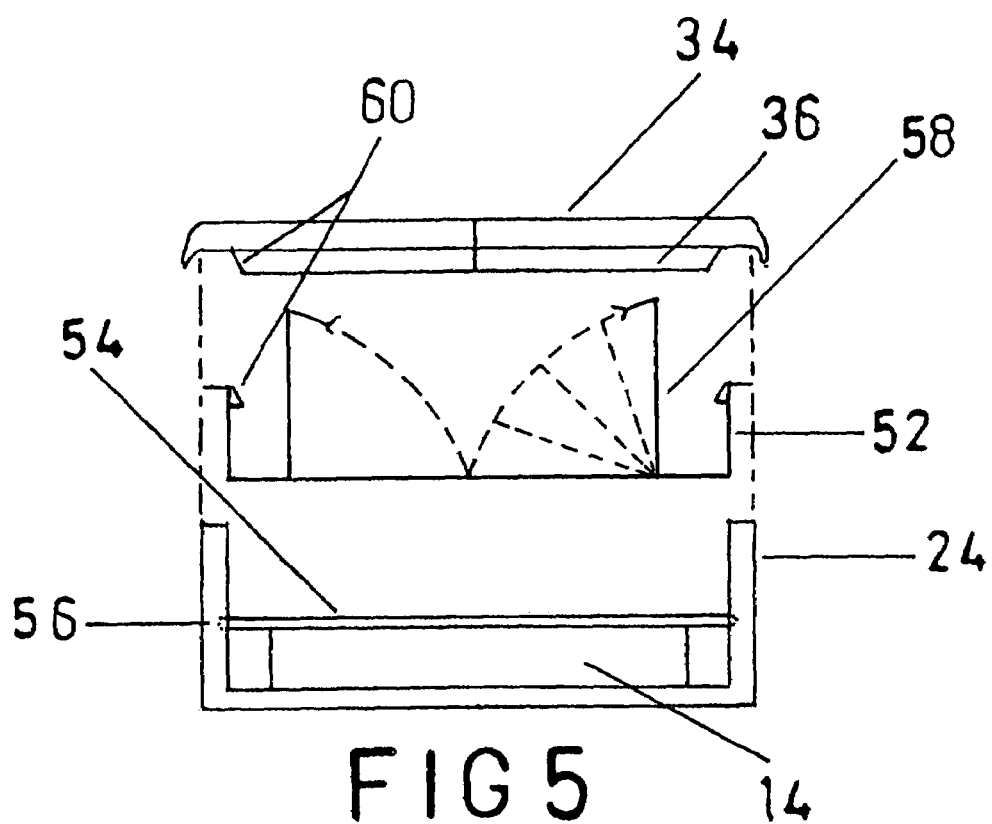
FIG. 5 is a rear sectional view of the open truck bed assembly of the supporting cross-member, one piece three sided molded raised floor with doors or hatches and split cargo bed covers.

Viewing FIG. 2 shows a side view of an pickup truck (11) and its cab (12) with open camper attached. FIGS. 3 and 4 show rear views of closed cargo bed covers (34) with rails (38) and with luggage covers or saddlebags (65). Viewing FIG. 5 one sees the assembly of the open truck cargo bed (14), cross member floor supports (54) setting on second tier manufactured cargo bed horizontal pockets (56). Above that is the one piece three sided molded raised floor (52) with doors or hatches (58) including molded in wedges or shims (60). The molded raised floor, only with a truck, sits on top of the cross-member floor supports (54). Above that are the split cargo bed covers (34) with supporting cargo bed cover lower structured frame (36) including matching alignment wedges or shims (60).

FIG. 6 shows the one piece three sided molded raised floor (52) and how the cargo bed covers join together, showing alignment of the wedges or shims (60) and the cargo bed stabilizer (74) and cargo bed cover pin (70). Also, there are perimeter locks (72) on the cargo bed cover.

Figure 7:
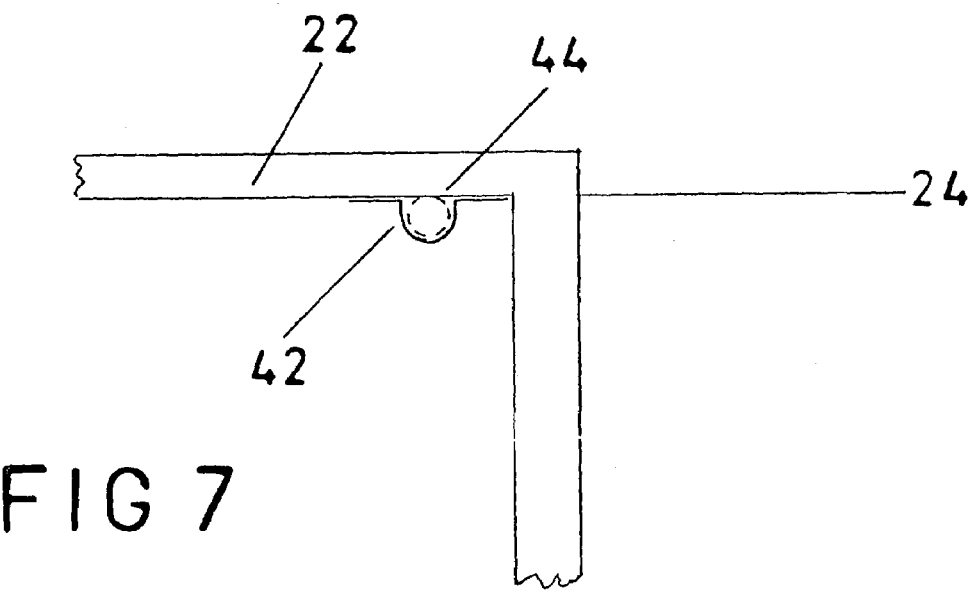
FIG. 7 top close-up view of the right front corner of the cargo bed and the main frame tent support and the main frame tent support lock.
Figure 8:
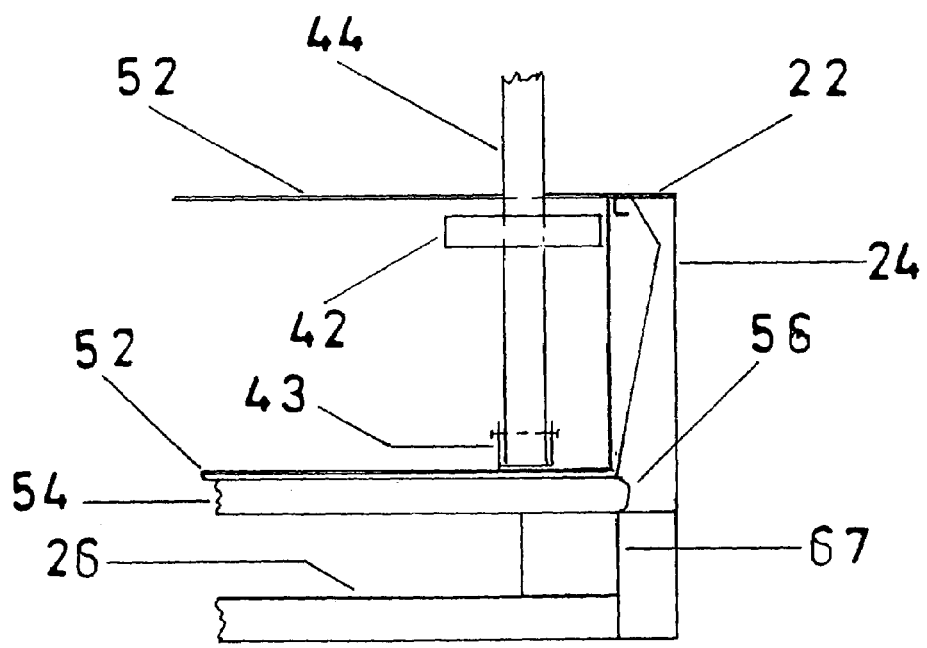
FIG. 8 rear close-up view of the right front corner of the cargo bed, the main frame tent support and the main frame tent support lock.

Viewing FIGS. 7 and 8 shows the right front corner of the cargo bed and the raised rigid main frame tent supports (44) with the main frame tent support locks (42) and pivot base (43). Acknowledgement is also made that the rigid main frame tent supports could also be placed on the cargo bed floor without a raised floor.

Figure 9:
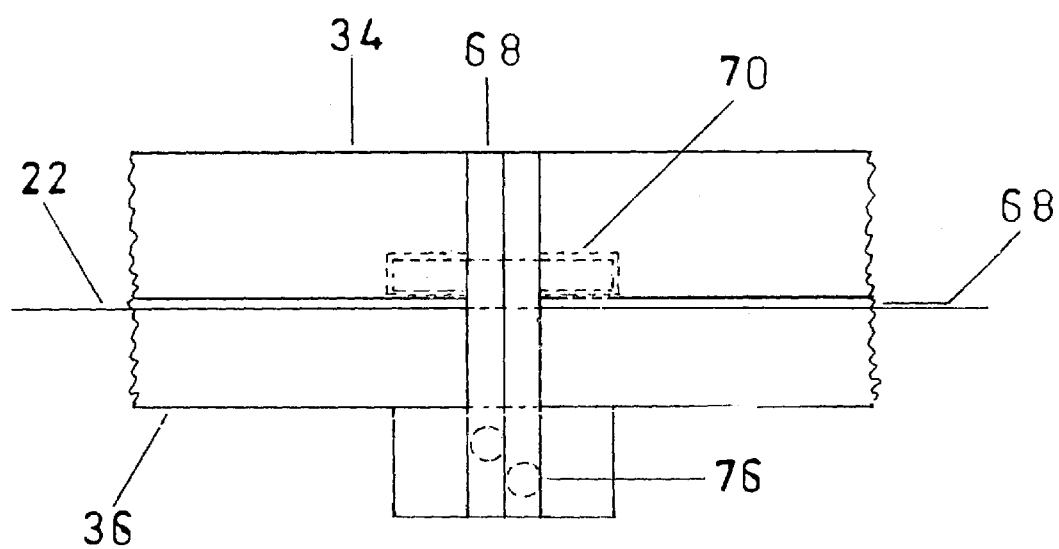
FIG. 9 rear close-up view of the mid-point lock down with the cargo bed cover.
Figure 10:
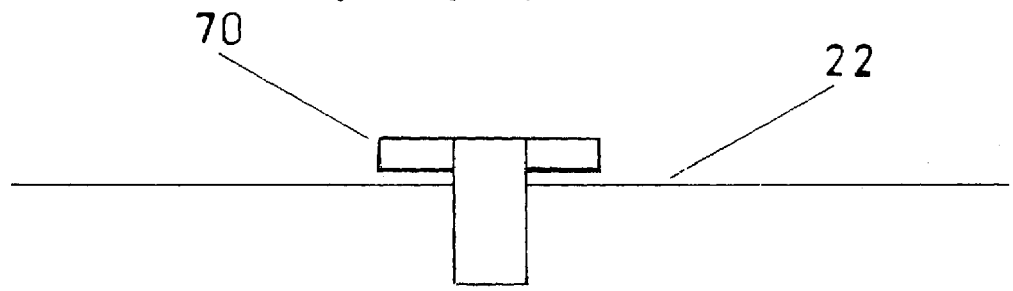
FIG. 10 rear close-up view of the mid-point lock down without the cargo bed cover.

FIGS. 9 and 10 show the joining of the split cargo bed cover's top surface (34) and the cargo bed cover's lower structured frame (36) with the cargo bed's mid-point lockdown (70). It also shows the cargo bed cover pins (76) and the weather stripping (68).

Figure 11:
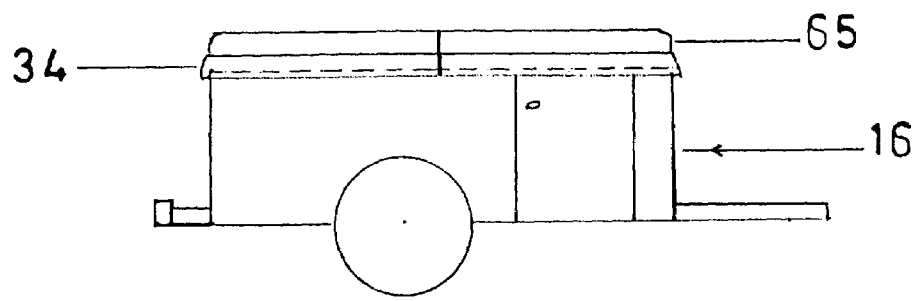
FIG. 11 side view of the closed trailer with luggage cover.
Figure 12:
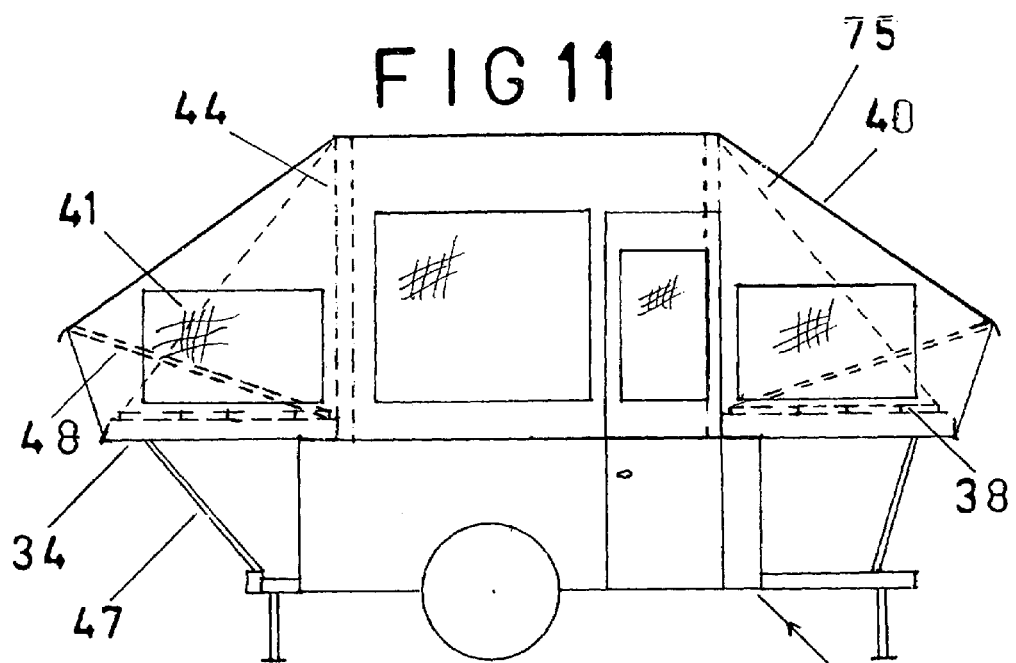
FIG. 12 side view of the open trailer with the tent raised.

Viewing FIGS. 11 and 12 we see the adaptable cargo bed cover on a closed and open camping trailer (16). Also, showing the luggage covers (65) attached over the cargo bed covers.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings or claims and described in the specifications are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A tent camper for a vehicle cargo bed with two opposing longitudinal sides perpendicular to two shorter facing sides and also having a floor for a base with an entrance on at least one side of said camper comprising:
    split cargo bed covers, wherein each cover is one piece, having a top and a bottom, and made of structurally integrated rigid material;
    wherein, the bottom of the split cargo bed covers slide open and closed on intervening sides of a one piece three sided molded raised floor supported by the top of the cargo bed sides and perimeter of the cargo bed;
    the split cargo bed covers use their tops or weathered surfaces for sleeping or storage;
    the split cargo bed covers, when extended are surrounded by a raised tent attached to more than one rigid main frame tent support pivotally connected to a lower surface of the one piece three sided molded raised floor.

2. The tent camper of claim 1 wherein the split cargo bed covers are adaptable to pick up trucks and open trailers.

3. The tent camper of claim 1 wherein the split cargo bed covers, depending on cargo bed design, slide open and closed on a trailer in a north and south longitudinal direction and on a truck in an east and west direction both from the mid-point of the cargo bed.

4. The tent camper of claim 1, wherein: the split cargo bed covers are supported by one or more ground support poles.

5. The tent camper of claim 1 wherein the split cargo bed covers main support, while extended, are the cargo bed sides and at least one ground support poles.

6. The tent camper of claim 1 wherein the split cargo bed covers mid-point lock down and perimeter locks along with a stabilizer and pin form a structurally integrated combination with the vehicle cargo bed.

7. The camper of claim 1 wherein the split cargo bed covers have sections which are lockable, along with the entrance to form a secure and protected combination from theft and the weather.

8. The tent camper of claim 1 wherein the split cargo bed covers include rails which are added to hold and align a mattress in place and also used to connect one or more safety wires to the main frame tent supports with the rail running around three sides of each cargo bed cover.

9. The tent camper of claim 1 wherein the main frame tent supports are connected to the split cargo bed cover rails.

10. The tent camper of claim 1 wherein the cargo bed covers are adapted to receive an accessory selected from the class of accessories including luggage covers and saddle bags for additional storage and protection of the cargo bed covers.

11. The tent camper of claim 1 wherein wedges and shims are adapted to be utilized for support and alignment.

12. The tent camper of claim 1 wherein the rigid main frame tent supports lock into the upright position by placing them into main frame locks.

13. The tent camper of claim 1 wherein a main section of a tent is attached to the main frame tent support at the top and that portion of the tent extending over the bed covers wrap around and attach to the bottom of the bed covers by a strap.

14. The tent camper of claim 1 wherein water resistant weather stripping seals the perimeter and the center of the covers from the weather and the elements.

15. The tent camper of claim 1 wherein the floor is the one piece three sided molded raised floor in a truck that is supported on cross-member floor supports, the floor being made of a structurally rigid material.

* * * * *

UNITED STATES PATENT AND TRADEMARK OFFICE
CERTIFICATE OF CORRECTION

| | |
|---|---|
| PATENT NO. | : 7,322,637 B2 |
| APPLICATION NO. | : 11/101322 |
| DATED | : January 29, 2008 |
| INVENTOR(S) | : Edward John Smith |

Page 1 of 1

It is certified that error appears in the above-identified patent and that said Letters Patent is hereby corrected as shown below:

Title Page, item (56) References Cited, correct the Patent Number of the 5th U.S. Patent Document cited from: "3,468,082" to --3,466,082--.

Signed and Sealed this

Twenty-ninth Day of April, 2008

JON W. DUDAS
*Director of the United States Patent and Trademark Office*